Aug. 8, 1967  L. H. LEONARD, JR  3,334,492
ABSORPTION REFRIGERATION SYSTEMS
Filed Dec. 8, 1964  2 Sheets-Sheet 1

INVENTOR.
LOUIS H. LEONARD, JR.
BY
Frank N. Decker Jr
ATTORNEY.

Aug. 8, 1967 L. H. LEONARD, JR 3,334,492
ABSORPTION REFRIGERATION SYSTEMS
Filed Dec. 8, 1964 2 Sheets-Sheet 2

INVENTOR.
LOUIS H. LEONARD, JR.
BY Frank N. Decker Jr.
ATTORNEY.

3,334,492
ABSORPTION REFRIGERATION SYSTEMS
Louis H. Leonard, Jr., De Witt, N.Y., assignor to Carrier Corporation, Syracuse, N.Y., a corporation of Delaware
Filed Dec. 8, 1964, Ser. No. 416,768
2 Claims. (Cl. 62—148)

This application relates to absorption refrigeration systems and, more particularly, to an improved control system for varying the capacity of an absorption refrigeration machine.

In most absorption refrigeration systems, it is desirable to provide a means of adjusting the refrigeration capacity of the system to accommodate a wide range of different or varying refrigeration loads which may be imposed on the system. The simplest method of control consists in turning the machine on or off depending on whether there is a demand for refrigeration. Generally, however, this type of control is unsatisfactory for air conditioning and refrigeration applications where it is desirable that the machine produce chilled water at a specific temperature at all times. Consequently, various means of modulating the capacity of an absorption refrigeration system to provide a uniform chilled water temperature is generally required. In a typical absorption refrigeration machine of the type employing a hygroscopic aqueous salt solution, such as lithium bromide as the absorbent and water as the refrigerant, a danger exists that excessive heat input to the generator may cause overconcentration of the salt solution and blockage of solution passages. It is therefore also desirable for the control system to reduce the heat input to the generator to prevent overconcentration of the absorbent solution, especially when the absorption machine is operated at reduced capacities, where the tendency to overconcentrate becomes more acute.

In the past, control of an absorption refrigeration machine has been satisfactorily achieved by employing various arrangements such as shown in Berestneff et al. Patent No. 3,054,272, granted Sept. 18, 1962, to which reference is made for a detailed description of the control features and operation of typical absorption refrigeration machines. The control systems illustrated by the foregoing patents, require various control valves for regulation of the capacity of the absorption machine. While satisfactory valves can be obtained for use with absorption machines, such valves are generally expensive and require sealing against the entrance of ambient atmosphere into the absorption machine.

Accordingly, it is a principal object of this invention to provide an improved absorption refrigeration system and method of operating the same, including an improved control arrangement.

In the illustrated preferred embodiment of this invention, the above and other objects thereof are achieved by providing an absorption refrigeration machine having an absorber, an evaporator, a generator and a condenser connected by passages to provide refrigeration. The generator comprises a plurality of heat exchange tubes for heating and concentrating absorbent solution therein. Inlet and outlet passage means are provided to pass a heating medium, such as hot water, through the heat exchange tubes in the generator. A pump is provided in the heating medium passage means to forward the hot water or other heating medium through the generator heat exchange tubes. The capacity of the refrigeration machine and the concentration of the absorbent solution leaving the generator are controlled by varying the speed of the pump in accordance with some condition of operation such as the refrigeration load imposed on the machine. Preferably, the control circuit comprises a phase control which adjusts the average power supplied to the pump motor on each half cycle of alternating current in accordance with the leaving chilled water temperature from the absorption machine. A minimum pumping capacity may be provided to smooth out the operation of the machine.

These and other objects of this invention will be more readily understood by reference to the following detailed description and drawing wherein.

Figure 1:
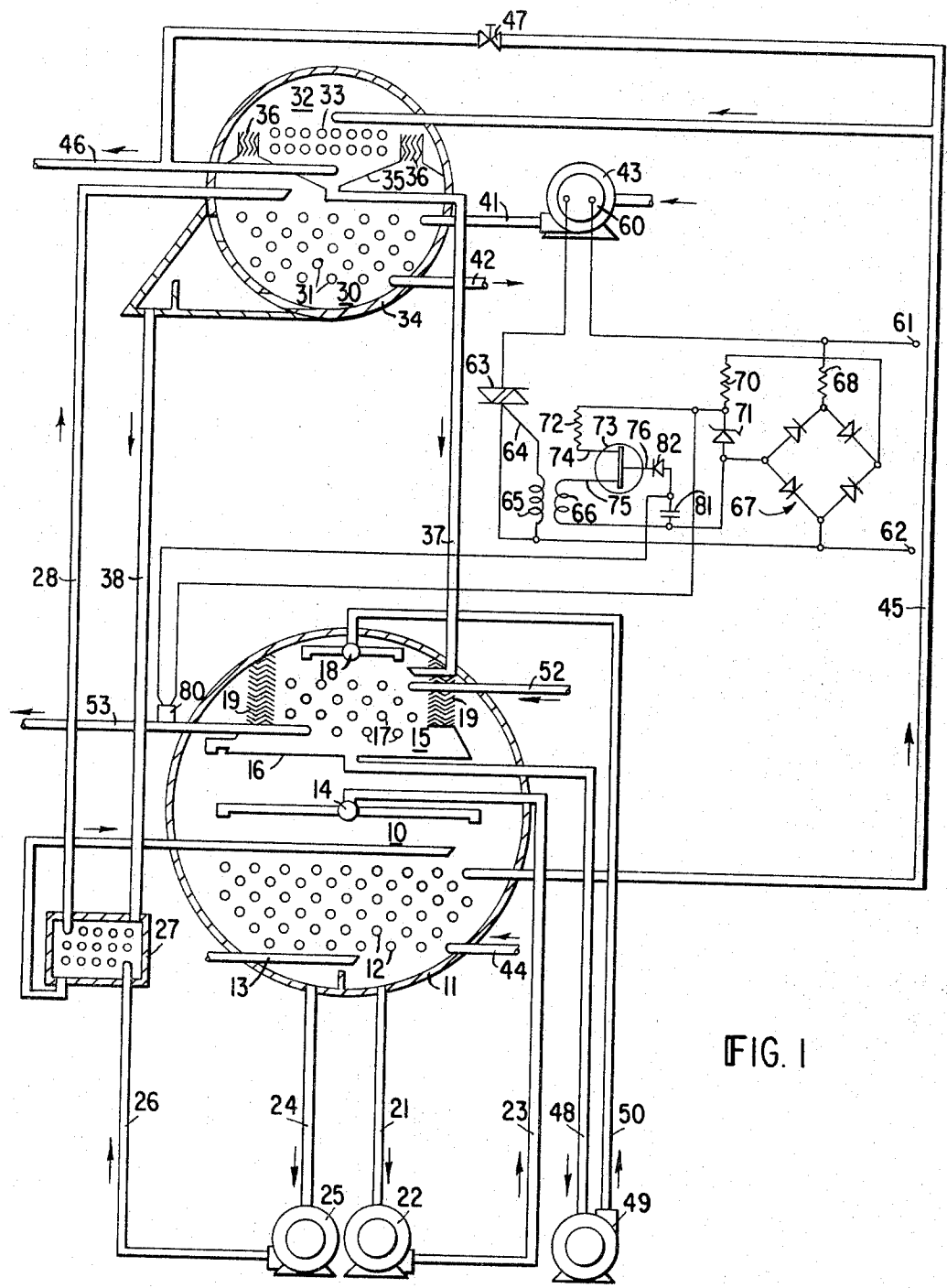
FIGURE 1 is a schematic view, partly in cross-section, showing one embodiment of an absorption refrigeration machine employing an improved control system in accordance with this invention.

Referring particularly to the drawing, there is shown a typical absorption refrigeration machine comprising an absorber section 10 within a shell 11. A plurality of heat exchange tubes 12 are provided within the absorber section. A purge line 13 leads from the absorber and conducts noncondensible gases therefrom to a suitable purge unit (not shown). A spray header 14 is located above the absorber section.

Also disposed in shell 11 is an evaporator section 15 comprising a pan-like member 16 within which is disposed a plurality of heat exchange tubes 17. A spray header 18 is located above heat exchange tubes 17 for distributing refrigerant thereover. Evaporator section 15 is in open communication with absorber section 10 through eliminators 19 which prevent entrained liquid refrigerant particles from being carried from evaporator 15 into absorber 10.

In operation, a suitable refrigerant is sprayed over tubes 17 in evaporator section 15 and a suitable absorbent solution is sprayed over tubes 12 in absorber section 10. Consequently, refrigerant is vaporized in evaporator section 15 and passes through eliminators 19 into absorber section 10 where the refrigerant vapor is absorbed by the absorbent solution. The vaporization of the refrigerant in evaporator section 15 absorbs heat from the fluid passing through heat exchange tubes 17 and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid to be chilled passing through heat exchange tubes 17.

Line 21 is connected to pump 22 and serves to circulate absorbent solution of intermediate strength accumulated in the lower portion of absorber section 10 through line 23 and spray header 14 over tubes 12. A line 24 leads from a lower portion of absorber section 10 containing weak solution and pump 25 serves to pass the weak solution through line 26 and solution heat exchanger 27 through line 28 to generator section 30. Pump 25 may pass a constant quantity of solution from absorber 10 to generator 30 under all conditions of operation of the machine.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution. A suitable absorbent for a refrigeration system of the type described comprises a hygroscopic aqueous salt solution such as lithium bromide and water; a suitable refrigerant is water.

The absorption of refrigerant vapor by absorbent solution in absorber section 10 dilutes the absorbent solution and diminishes the refrigerant supply. In order to maintain the refrigeration machine in operation, it is necessary to concentrate this weak solution by separating it from the absorbed refrigerant. For this purpose, a generator section 30 and a condenser section 32 are provided.

Generator section 30 is located in shell 34 and comprises a plurality of heat exchange tubes 31 for passing hot water or other heating medium. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return relatively hot, strong absorbent solution from the generator section to the absorber section while passing it in heat exchange relation with relatively cool, weak solution being forwarded to the generator for concentration therein.

Inlet line 41 and outlet line 42 are provided to pass a liquid heating medium such as hot water through heat exchange tubes 31 of generator 30, in order to concentrate the weak solution by boiling off refrigerant vapor therefrom. A pump 43 is provided, preferably in line 41, to pass the supply of heating medium through the generator. Pump 41 could alternatively be located in line 42, if desired.

The refrigerant vaporized in generator 30 passes through eliminators 36 and is condensed in condenser 32. A cooling water inlet line 44 is connected to heat exchange tubes 12 in absorber section 10 from which the cooling water passes through line 45 and heat exchange tubes 33 in the condenser section. The cooling water is then discharged through line 46. An appropriate bypass line and valve 47 may be provided to bypass cooling water around the condenser section to provide a minimum condensing temperature. The cooling water serves to remove the heat of dilution and condensation from the absorbent solution in absorber section 10 and serves to remove the heat of vaporization to condense refrigerant vapor in condenser section 32.

A suitable recirculation line 48 and recirculation pump 49 pass refrigerant from pan 16 of the evaporator section through line 50 to spray header 18 so that refrigerant may be sprayed over heat exchange tubes 17 to wet them and aid in evaporation of the refrigerant and cooling of heat exchange tubes 17. Entering line 52 and leaving line 53 are provided to conduct a heat exchange fluid to be cooled, such as water, through heat exchange tubes 17, to cool the fluid by the resulting heat exchange with the evaporating refrigerant in evaporator 15. This cooled heat exchange fluid is then passed through line 53 to suitable remotely located heat exchangers (not shown) to provide cooling in the desired areas.

In accordance with this invention, pump 43 is preferably driven by an alternating current motor 60 which is connected to a source of alternating current such as power line terminals 61, 62 through a switch 63. Switch 63 may desirably be a bidirectional gated solid state switch of a type sold under the trademark "Triac." Switch 63 is provided with a gate 64 in series with the secondary winding 65 of a pulse transformer by which the switch is triggered to a conducting state by either a positive or negative pulse being applied to gate 64. Switch 63 should be sufficiently fast in operating so that it may be switched on during any desired portion of each half cycle of alternating current supplied to motor 60, to provide a desired average power so that the motor speed and consequent pump speed is varied in accordance with the capacity demand on the absorption machine.

A control circuit is provided to control the operation of switch 63 in accordance with the desired capacity of the absorption machine. As shown in the drawings, a full wave diode rectifier circuit 67 is connected in series with a dropping resistor 68 to provide a source of DC voltage across a series connected resistor 70 and Zener diode 71. It will be appreciated that Zener diode 71 has a variable resistance characteristic such that it provides a constant voltage drop across its terminals. A series circuit comprising unijunction transistor 73 having one base 74 connected in series with the primary winding 66 of the pulse transformer is connected across Zener diode 71 to provide a constant voltage to the series circuit.

A temperature sensitive resistance element, such as thermistor 80, is connected in series with a charging capacitor 81 across the constant voltage provided by Zener diode 71. Thermistor 80 is preferably secured to leaving chilled water line 53 to sense the refrigeration load on the absorption machine by sensing the leaving chilled water temperature. Unijunction transistor 73 has an emitter 76 which is connected, through a diode 82 which prevents leakage current from charging capacitor 81, to a junction between thermistor 80 and capacitor 81. It may be desirable in practice to add various additional circuits to prevent spurious gating of switch 63. Also, it is desirable to employ a high resistance motor rotor in motor 60 having a resistance tailored to the control circuit for best operation.

It will be appreciated that the circuit shown is illustrative generally of a phase control type of motor speed control. The circuit shown is merely illustrative of one type of motor speed control system and other types of motor speed control can be adapted to this invention.

In operation, switch 63 is in a nonconducting state and motor 60 is deenergized until a pulse is applied to gate 64. A charge builds up on charging capacitor 81 at a rate which is determined by the resistance of thermistor 80, which in turn is a function of the chilled water temperature in line 52. When the charge on capacitor 81 reaches a predetermined value, unijunction transistor 73 becomes conducting and the charge on capacitor 81 is discharged through primary winding 66 of the pulse transformer. When capacitor 81 discharges, a pulse is induced in secondary winding 65 of the pulse transformer which is applied to gate 64 of switch 63 causing the switch to conduct.

Switch 63 is preferably a solid state device having the characteristic that once it is turned on by a pulse being applied to gate 64, it remains in the conducting state until the voltage across the device becomes negligible. Consequently, switch 63 remains conducting after a pulse is applied to gate 64 until the end of the half cycle of alternating current during which it begins conducting. The value of the electrical components are chosen so that switch 64 is turned on for a time during each half cycle by the control circuit such that the power supplied to motor 60 is just sufficient to rotate pump 43 at a speed which provides the desired refrigeration capacity. The resistance range of thermistor 80, is chosen so that as the leaving chilled water temperature in line 52 increases, indicating an increased refrigeration load, the resistance of the thermistor decreases and capacitor 81 charges more rapidly. Consequently, switch 63 is turned on for a greater period of time during each half cycle of alternating current, thus increasing the speed of motor 60 and the capacity of pump 43 to provide greater flow of heating medium to generator 30. The additional flow of heating medium to generator 30 provides increased strong solution concentration and, consequently, increases the refrigeration capacity of the machine to compensate for the increased load, to reduce the chilled water temperature to the desired temperature.

It will be appreciated that this control also serves to prevent overconcentration of strong solution in generator 30 to prevent crystallization of strong solution when cooled in heat exchanger 27 by reducing the supply of heating medium to generator 30 when the leaving chilled water temperature in line 53 drops.

Alternatively, the speed of motor 60 may be responsive to any suitable condition of operation of the system, such as strong solution temperature in line 38 or a difference between generator and condenser temperatures, or the level of solution in absorber 10, as a means of controlling the refrigeration capacity and preventing overconcentration of the strong solution.

It is preferred to design the control system so that motor 60 has a minimum operating speed and pump 43 always supplies a minor fraction of the full load heating medium flow to the generator at light loads when the system is operating, in order to smooth out the operation of the system by preheating the solution and maintaining it close to the boiling point. By maintaining a minimum pump capacity at light refrigeration loads, the solution is kept warm so that the operation of the machine is smoother and "hunting" is reduced.

A control system in accordance with this invention has the advantage that capacity control of the refrigeration machine is achieved while completely eliminating the need for a solution valve or heating medium supply valve. Since a pump for heating medium is generally required on absorption machines heated by hot liquid, it is only necessary to provide a suitable speed control for the heating medium pump motor.

Figure 2:
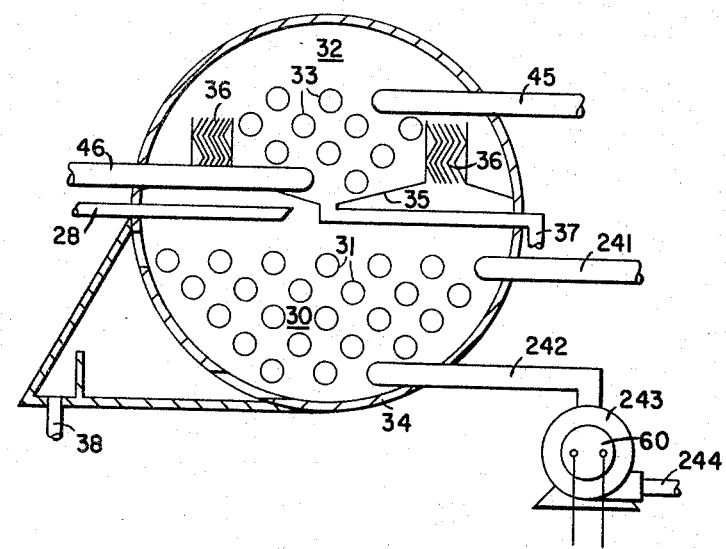
FIGURE 2 is a schematic fragmentary cross-sectional view through the generator and condenser of an absorption refrigeration machine embodying a modified form of this invention.

In FIGURE 2 there is shown a modified form of this invention wherein similar reference characters indicate corresponding parts of the generator and condenser sections as shown in FIGURE 1 in this embodiment. Line 241 is provided to pass steam through generator tubes 31 as a heating medium for heating absorbent solution in the generator. Steam condensate is drained from tubes 31 through line 242 and is passed by pump 243 through steam condensate return line 244. Pump 243 is driven by variable speed motor 60, the speed of which is controlled in a manner similar to motor 60 shown in FIGURE 1. When the leaving chilled water temperature drops indicating a reduced load on the machine, the speed of pump 243 is reduced so that steam condensate is permitted to back up into generator tubes 31 and less heat is supplied to the generator.

Figure 3:
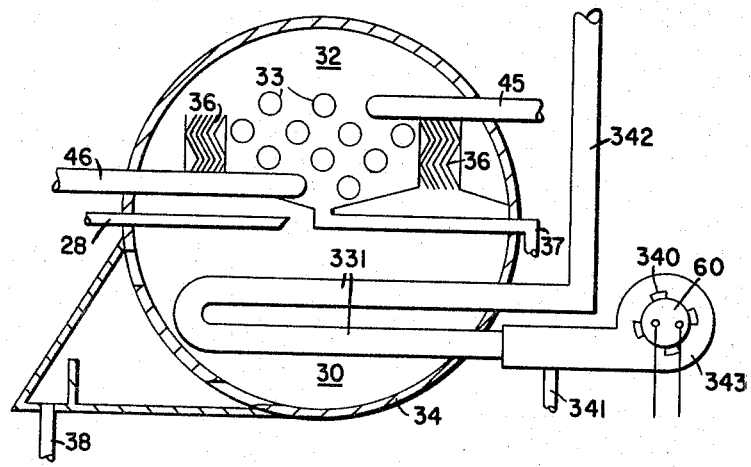
FIGURE 3 is a schematic fragmentary cross-sectional view through the generator and condenser of an absorption refrigeration machine employing another embodiment of this invention.

A still further modification of this invention is shown in FIGURE 3 wherein similar reference numerals indicate the corresponding parts shown in FIGURE 1. In this embodiment of the invention a gas pipe 341 supplies gas to fire tubes 331 in the generator to heat absorbent solution therein. A blower 343 is provided with a variable speed motor 60 which is controlled in accordance with the system shown in FIGURE 1. Blower 343 has air inlet ports 340 to mix with the gas and the mixture is passed through the generator as a heating medium. The quantity of gas and air supplied to fire tubes 331 is varied in accordance with the refrigeration demand imposed on the machine. Flue gas from fire tubes 331 is exhausted through flue 342 to the atmosphere. When the leaving chilled water temperature rises indicating an increased refrigeration demand, the speed of motor 60 is increased so that more fuel is supplied to the generator and thus the absorbent solution is more highly concentrated to satisfy the increased refrigeration demand.

While this invention has been described with reference to varying the speed of an electric motor to vary the capacity of a pump supplying heating medium to the generator, it will be appreciated that other embodiments of this invention may be suitably employed to vary the capacity of an absorption refrigeration machine. For example, other types of pump speed controls such as magnetic couplings or variable speed turbines may be used.

Accordingly, it will be appreciated that various modifications of this invention will be apparent to those skilled in the art. It will therefore be appreciated that there is shown and described merely a preferred embodiment of the invention and that it may be otherwise embodied in the scope of the following claims.

I claim:

1. An absorption refrigeration machine comprising an absorber, an evaporator, a generator, and a condenser connected to provide refrigeration; passage means for passing heating medium through said generator; a pump in said passage means for passing heating medium through said passage means; an alternating current energized electric motor connected to drive said pump; said alternating current electric motor being connected with a source of alternating current for energizing said motor and electrical control means interposed between said source of alternating current and said motor for controlling the flow of current to said motor to automatically control the speed of said electric motor in response to the refrigeration load imposed on said refrigeration machine to control the capacity thereof said control including switch means for varying the effective power supplied to said electric motor said switch means varying the length of time during a cycle of alternating current that current passes from said source of alternating current through said motor to energize said motor as a function of the refrigeration demand on said machine.

2. An absorption refrigeration machine comprising an absorber, an evaporator, a generator, and a condenser connected to provide refrigeration; said refrigeration machine being connected so that a substantially constant quantity of absorbent solution is passed from said absorber to said generator under all conditions of operation thereof; a passage for passing heating medium through said generator; a pump in said passage for passing heating medium through said passage; an alternating current energized electric motor connected to drive said pump; said alternating current electric motor being connected with a source of alternating current for energizing said motor and electrical control means interposed between said electric motor and said source of alternating current to control the flow of current through said motor to automatically control the speed of said electric motor in response to the refrigeration load imposed on said refrigeration machine to control the capacity thereof said control means including switch means for varying the effective power supplied to said motor said switch means varying the length of time during a cycle of alternating current that current passes from said source of alternating current through said motor to energize said motor as a function of the refrigeration demand on said machine, said control means being arranged to provide a minimum operational pump speed so that at least some heating medium is supplied to said generator under conditions of light refrigeration load.

References Cited

UNITED STATES PATENTS

| | | | |
|---|---|---|---|
| 1,975,086 | 10/1934 | Dickey | 122—451 |
| 2,372,087 | 3/1945 | Karassik | 122—451 |
| 3,195,318 | 7/1965 | Miner | 62—148 |

LLOYD L. KING, *Primary Examiner.*